United States Patent [19]
Wirt

[11] 3,734,234
[45] May 22, 1973

[54] SOUND ABSORPTION STRUCTURE
[75] Inventor: Leslie S. Wirt, Newhall, Calif.
[73] Assignee: Lockheed Aircraft Corporation, Burbank, Calif.
[22] Filed: Nov. 8, 1971
[21] Appl. No.: 196,616

[52] U.S. Cl. ..............................181/33 G, 181/33 H
[51] Int. Cl. ................................................E04b 1/82
[58] Field of Search .......................181/33 G, 33 GA, 181/33 C, 33 E, 33 H, 33 HA, 33 HB; 343/18 A; 333/98 R, 83 R

[56] References Cited
UNITED STATES PATENTS

| | | | |
|---|---|---|---|
| 1,738,654 | 12/1929 | James | 181/33 G UX |
| 1,554,179 | 9/1925 | Trader | 181/33 G UX |
| 2,107,038 | 2/1938 | Lennard | 181/33 G UX |
| 2,809,908 | 10/1957 | French | 181/33 G UX |
| 3,481,427 | 12/1969 | Dobbs et al. | 181/33 G UX |
| 3,640,357 | 2/1972 | Kitching et al. | 181/33 H X |

FOREIGN PATENTS OR APPLICATIONS 851,675  10/1960  Great Britain......................181/33 G

*Primary Examiner*—Richard B. Wilkinson
*Assistant Examiner*—John F. Gonzales
*Attorney*—George C. Sullivan et al.

[57] ABSTRACT

A sound absorbing structure, generally comprising a honeycomb-like cellular layer, an impermeable backing closing one end of the cells, a permeable facing covering the other end of the cells, and oblique porous or permeable partitions having a specified flow resistance in each cell, for providing controlled acoustic absorption over a wide range of frequencies and having a minimum ability to wick and retain liquids. The operation of the structure is relatively independent of the materials from which it is made, and may for example be fabricated entirely from metal. It is particularly suitable for sound attenuation in jet engines and other adverse environmental conditions requiring sound absorptive panels, baffles, duct liners, and duct splitters.

43 Claims, 21 Drawing Figures

Patented May 22, 1973 3,734,234

LESLIE S. WIRT
INVENTOR.

BY George C. Sullivan
Ralph M. Flygare
Agents

LESLIE S. WIRT
INVENTOR.

Patented May 22, 1973
3,734,234

LESLIE S. WIRT
INVENTOR.

BY *George C. Sullivan*
*Ralph M. Flygare*
Agents

Patented May 22, 1973  3,734,234

LESLIE S. WIRT
INVENTOR.

BY George C. Sullivan
Ralph M. Hogane
Agents

Patented May 22, 1973

LESLIE S. WIRT
*INVENTOR.*

BY *George C. Sullivan*
*Ralph M. Flygare*
Agents

LESLIE S. WIRT
*INVENTOR.*

SOUND ABSORPTION STRUCTURE

BACKGROUND OF THE INVENTION

Various types of bulk fibrous materials, such as fiberglass or open-pore plastic foams have been employed heretofore as efficient sound absorbers over a broad range of frequencies. Although such materials exhibit desirable acoustical properties, in certain instances other physical characteristics render them unsuitable for exposure to severe environmental conditions. For example, foams or bulk fibrous materials made of organic substances may be destroyed or adversely effected by elevated temperatures. The binders used to give fiberglass some degree of cohesion are similarly subject to adverse changes at elevated temperatures. Another shortcoming of many prior art absorbers is that vibration and high velocity gas impingement both cause a progressive breakdown of the material.

A necessary condition of many applications is the exposure of the acoustic absorbing material to liquids, such as water or fuel. In certain instances the liquid may be in the form of vapor, mist, or airborne droplets. Bulk fibers or foams tend to retain such liquids by capillary action, thereby impairing operation. Aside from the possible deterioration of the desired acoustical properties, retention of inflammable liquids can create serious hazards. For these reasons, the use of bulk fibrous materials and foams is virtually precluded for application in or near aircraft engines, gas turbines, and the like.

The chief alternatives to the use of bulk fiber or foam, as a sound absorbing means, are resonators or structures known as laminar absorbers. Examples of these prior devices are shown in U.S. Pat. Nos. 3,113,634 and 3,439,774. These two types of devices are somewhat related as will be seen from the following discussion.

It is known, to those versed in the art, that a thin permeable sheet of flow resistive material separated from an impermeable surface by an air space provides a usable sound absorptive structure of the type known as "laminar absorbers". The sound absorptive spectrum of a laminar absorber consists of a series of absorptive peaks separated by frequency ranges in which little or no absorption occurs. If sound waves strike the permeable surface at an oblique angle, it is desirable that the space behind the permeable sheet be compartmented. To accomplish this, a common construction comprises a sandwich panel using one permeable sheet, one impermeable sheet, and an interposed honeycomb core. The core material thus provides the required compartmentation. This arrangement is disclosed in the aforementioned prior art patents and may also be found in U.S. Pat. No. 2,159,488.

It is possible to broaden the bands of frequencies in which the aforementioned panel is absorptive by the use of two or more permeable sheets separated by two or more core structures. This series arrangement is shown in U.S. Pat. No. 3,439,774. These structures, however, have proven to be very expensive and difficult to construct.

The type of permeable sheets used to construct prior laminar absorbers are commonly formed of rather closely woven fabrics or plastic textiles, felted metallic or nonmetallic fibers, or combinations thereof. In all cases, these present an appreciable resistance to flow through the sheet. This resistance to flow is essential to the sound dissipative process, as will be explained more fully hereinafter. If perforated sheet is used in place of woven or felted sheets, the structure may be considered as a Helmholtz resonator, or, if the air space is compartmented, as a parallel array of such resonators. Such arrays of resonators are normally more sharply tuned and hence effective only over a restricted range of frequencies. If the perforations are quite numerous and of small dimension, the behavior of the resonator array tends to approximate a true laminar absorber.

Laminar absorbers or resonators have been used in certain applications by necessity, in lieu of bulk fibers or foams, notwithstanding several serious disadvantages, because of their compatibility with severe environmental conditions. One disadvantage has been their limited bandwidths of absorption as compared with bulk materials. Attempts to overcome this deficiency by the use of multiple layers leads to unacceptably heavy structures.

It has been found that both conventional laminar absorber and resonator structures are nonlinear in their acoustical properties such that if they operate best at one sound pressure level, they will operate less efficiently at either a higher or lower pressure level. Thus, if the absorber is optimized to acoustical conditions near the fan in a fan duct, for example, the same treatment will not be optimum further down the duct because the sound pressures are lower. Consequently, an optimum acoustical duct liner for use in silencing high intensity noise must actually be constructed with materials whose properties are a function of positioning in the duct. The associated engineering problem is therefore, obviously very complex.

SUMMARY OF THE INVENTION

There is provided by the present invention a sound absorptive system which is both functionally and structurally distinct from either a bulk fiber distributed flow resistance mechanism, or a laminar absorber, or a resonator, as has been previously known. The novel structure of the invention operates by means of a new, and previously undiscovered acoustical mechanism. This novel concept is based on the use of essentially pure resistive elements, as contrasted with prior art devices which are in actuality mainly reactive in nature.

In its simplest form the present invention comprises a permeable sheet which is spaced apart from an impermeable sheet by a cellular structure wherein each cell is provided with an oblique partition of resistive material. The geometry of the structure must conform to a specified mathematical model as is set forth in detail in a subsequent portion of this specification. A number of species and/or embodiments incorporating this novel geometry and concept will also be described.

It is therefore an object of the present invention to provide a novel and improved structure, suitable for use under extreme environmental conditions, which exhibits broad band acoustical absorption comparable to that of bulk fibers or foams.

Another object of the invention is to provide a novel and improved sound attenuating structure which will not wick up or retain appreciable amounts of liquids.

Still another object of the invention is to provide a novel and improved sound absorbing structure which is much more linear in its acoustical response, as compared with prior absorbers, such that it will operate efficiently over a wide range of sound pressure levels.

Another object of the present invention is to provide a novel and improved sound absorption structure which is simple and economical to fabricate.

Yet another object of the invention is to provide a novel and improved sound absorbing structure which is both sturdy and light in weight such that it can be used as a load carrying member in aircraft and similar applications.

DESCRIPTION OF THE PREFERRED EMBODIMENT

Figure 1:
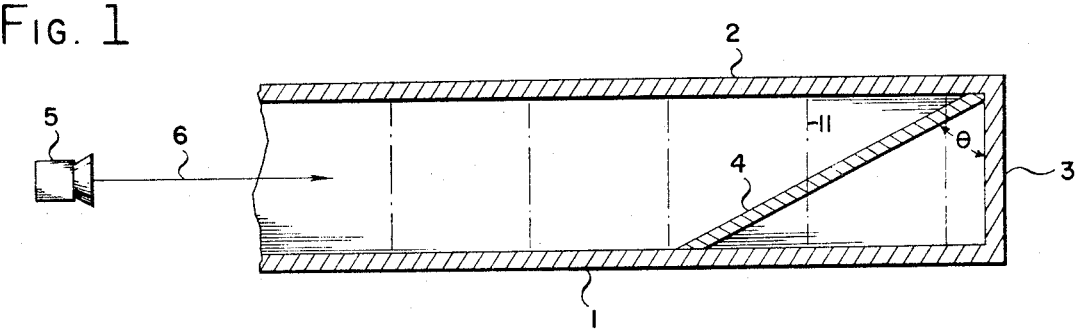
FIG. 1 is a cross sectional view illustrating a single absorber cell constructed in accordance with the invention.

Before setting forth the structural details of the invention it is desirable to present a more detailed outline of the pertinent sound absorptive process.

The propagation of sound involves a traveling pressure disturbance and an accompanying oscillation of the fluid particles. These disturbances transmit energy from one point in the fluid to another. Sound energy is attenuated by its dissipation into thermal energy. A permeable acoustical material contributes to the dissipation of acoustical energy by offering dissipative resistance to the oscillatory motion of the fluid particles in its interstices. Thus, the resistance to particle motion or flow through an acoustical material is a fundamentally important property. It is well known that the flow resistance to even steady state flow through an acoustical material (d.c. flow) correlates closely with the acoustical resistance of the material; i.e., its resistance to oscillating displacements.

The flow resistance of an acoustical material is defined as the ratio of the pressure differential across the material to the resulting fluid velocity $$\Delta P/U = R$$

If centimeter-gram-second (cgs) units are used, the unit of resistance is called the Rayl. Closely analogous expressions may be written for the oscillating sound pressure and its associated oscillating particle velocities:

$$p/u = z = r + 0`X$$

Here $z$ is called the acoustical impedance and is written as a complex number because the sound pressure and particle velocity are often not in phase.

For plane waves of sound, the acoustic impedance is real:

$z = r'$ Furthermore, $r$ has a characteristic value for each fluid, and in fact is equal to the product of the density and the speed of sound in the fluid:

$$r' = \rho c$$

The importance of the steady state measurement of flow resistance is the fact that in important cases the steady state flow resistance and the acoustical resistance are approximately the same:

$$r \cong R$$

It turns out that a bulk fiber or foam (distributed flow resistance) performs best if R is in the vicinity of $\rho c$ to $2\rho c$.

Similarly, the best value for the flow resistance of a permeable sheet used as a laminar absorber is in the vicinity of 1 $\rho c$ to 2 $\rho c$. If the flow resistance of a perforated sheet used in a resonator is in this same range, then the resonator behaves much like a laminar absorber.

Acoustical impedance or steady state flow data are frequently normalized by dividing by $\rho c$ and the results are said to be presented in $\rho c$ units.

The difficulty caused by the nonlinear behavior of acoustical materials results from the fact that R (and hence $r$) are not independent of P or $p$. For most materials $$\Delta P = R_o U + 25 R_1 U^2 \text{ or } \Delta P/U = R = R_o + R_1 U$$

$R_o$ is associated with viscous flow resistance which is dominant at small values of $\Delta P$ corresponding to small values of $p$.

The term involving $R_1$ is associated with turbulent flow in, and downstream of, the interstices. This effect is dominant at higher sound intensities.

Remembering that the most effective value for the flow resistance is about 1 $\rho c$ to 2 $\rho c$ (i.e., for ambient air about 40 to 80 Rayls), whereas the idealized material ($R_1 = 0$) would work equally well at all sound pressures, real materials ($R_1 > 0$) function well over a rather narrow range of sound pressure levels; typically about 20 db wide. This problem is much more serious with laminar absorbers or perforated sheets because their relatively small open areas produce high local flow velocity. The great porosity of most bulk fiber or foam materials mitigates these effects in distributed resistance systems.

There is shown in FIG. 1 a simplified structure illustrating a single cell of the type which may be combined in parallel with like cells to provide the novel array of a first embodiment of the invention. A tubular compartment of rectangular cross section is defined by parallel walls 1 and 2, and is closed at one end by solid wall termination 3. Not shown are two orthogonal walls defining the remaining side walls. The other end is open and is in communication with any noise source 5. For simplicity of explanation, the tube or compartment is considered to be smaller in diameter than half a wave length of the sound. With this restriction, the only sound waves which may propagate down the tube do so as plane waves and arrow 6 indicates the direction of propagation and line 11 represents the plane wave front at some instant in time.

The portion of the tube near the solid termination 3 is bisected obliquely by permeable element or partition 4 inclined at an angle $(90° - \theta)$ with the side wall. This is shown in enlarged detail in FIG. 2. The steady state flow resistance (as ordinarily measured) for the material comprising oblique partition member 4 has some value R.

The oblique laminar partition 4 provides the same broad-band absorption coefficient as would be obtained had the portion of the tube occupied by the partition been filled completely with a bulk fibrous material. Furthermore, even if the flow resistance of the oblique laminar partition 4 is somewhat nonlinear, the response of the system is relatively unaffected by the intensity of the impinging sound. Thus, in this regard, also, it resembles a bulk fiber distributed flow resistance.

Finally, the optimum value of R will be found to be a function of the angle $\theta$ such that $$R_{optimum} \cong 2 \rho c \sec \theta$$

where R is preferably measured at a value of $\Delta P$ corresponding to the average value of p expected in the application.

As a brief recapitulation of the essence of the invention, it may be said that in a sound field constrained by a wave guide to be plane waves, an obliquely placed flow resistive element provides the same sound absorptive bandwidth as a bulk fiber distributed flow resistance of corresponding total depth. Furthermore, it is about as linear in its behavior over a range of sound intensities.

As an illustration of the uncommon values of flow resistance to be chosen, consider the case of a tube one half inch in diameter and set L = 2 inches, where L is the depth of the space occupied by its oblique element. An optimum value for the total flow resistance of the fiberglass would be 40 to 80 cgs Rayls for operation in ambient air. Similarly, a laminar absorber to be placed across the tube would be optimum if its flow resistance were about 40 to 80 Rayls. The oblique element would, however, have an optimum value of R = 330 Rayls.

Figure 2:
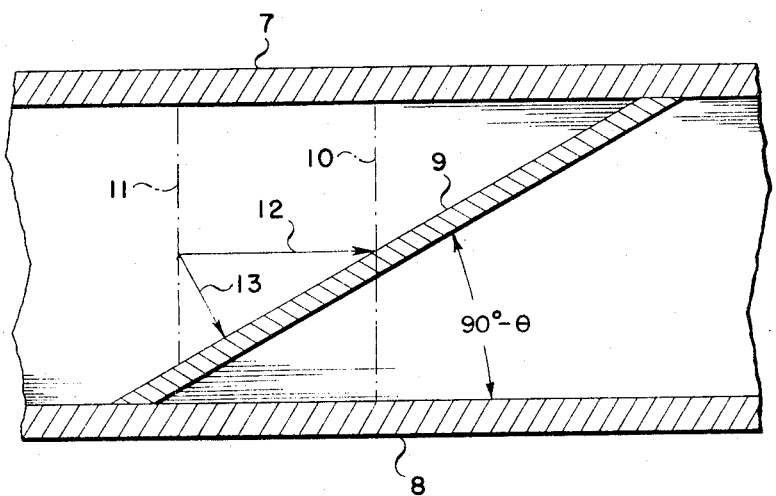
FIG. 2 is a fragmentary cross sectional view similar to a portion of the apparatus of FIG. 1.

This value of flow resistance is so much different from values usually considered in the prior art relating to acoustical materials as to be not commonly available. This illustrates how fundamentally different the structure is from all prior art absorbers. The reason for the relatively linear behavior is a self adjustment process which may be visualized as follows. Consider a wave front to have progressed to location 11 as shown in FIG. 2. Suppose in traveling to location 10, it encounters a flow resistance which is too great. The decreasing cross section causes the sound pressure to increase. The increased sound pressure induces a greater flow through the permeable element in the vicinity of 10 even though its flow resistance is too high.

In an ordinary laminar absorber, the entire normal wave front strikes the permeable surface. If the flow resistance is not optimum, a partial reflection occurs. If the flow resistance of the oblique element is locally too high, the wave continues in a converging manner until the increasing pressure can overcome the flow resistance or until a more desirable value of flow resistance is encountered due to local variation in the material.

The inherent differences between the present invention and certain prior art devices of the type referred to as multiple-degree-of-freedom resonators becomes evident when an attempt is made to fabricate its oblique elements from a perforated sheet. It has already been shown that the flow resistance R must be unusually large and that for all read real materials $R = R_0 + R_1 U$. For perforated plates $R_0$ is so small that it can scarcely be measured. $R_1$ can be shown to be inversely proportional to the square of its open area of the perforates. Thus, to attain the required large values of R it is necessary to utilize very small open areas in its perforate, i.e., $R_1$ becomes very large.

For such large values of $R_1$ the entire system again becomes very nonlinear and thus capable of operating only in a narrow range of sound pressures, partly because its self adjustment process, as previously described, fails. Moreover, the frequency response of the system loses its broadband characteristics and at best would be characterized by several absorption resonant peaks. Based on extensive tests it is concluded that ordinary perforated metal is unsuitable for use in the oblique elements, but that fibrous type sheets are well suited for the purpose. There are certain metal foils having almost microscopic perforations that provide values of $R_1$ intermediate between ordinary perforates and felted fiber or woven sheets. These provide usable though non-optimum performance when used as oblique elements.

The flow resistance may be expressed as follows:

$$R_{optimum} = 2 \rho c \sec \theta.$$

It may be restated as:

$$R_{optimum} = A \rho c \sec \theta \quad A \cong 2$$

The approximate law: $R_{optimum} \cong 2 \rho c \sec \theta$ is confirmed by extensive experiment with many different geometries of oblique elements, but may also be deduced in the following manner: The projected area of the oblique element is $S \sec \theta$, where S is its cross sectional area of the wave guide. It is therefore evident that since the area is greater, the flow resistance per unit area must be greater by the same factor if the same total flow resistance through its oblique obstruction is to be attained; i.e., 1 to 2 $\rho c$. The law $R = 2 \rho c \sec \theta$ is approximate mainly because the choice between 1 and 2 $\rho c$ is mainly one of designer's preference. For any type of material the larger value tends to broaden the frequency response at the expense of peak attenuation. In general, the present invention relates to providing broadband absorption, so the higher value is preferred.

It is evident that the basic concept may be implemented in a wide variety of forms. It is also evident that the principles set forth herein may be applied only in part, or with non-optimum values of the parameters leading to apparently different geometries.

Figure 3:
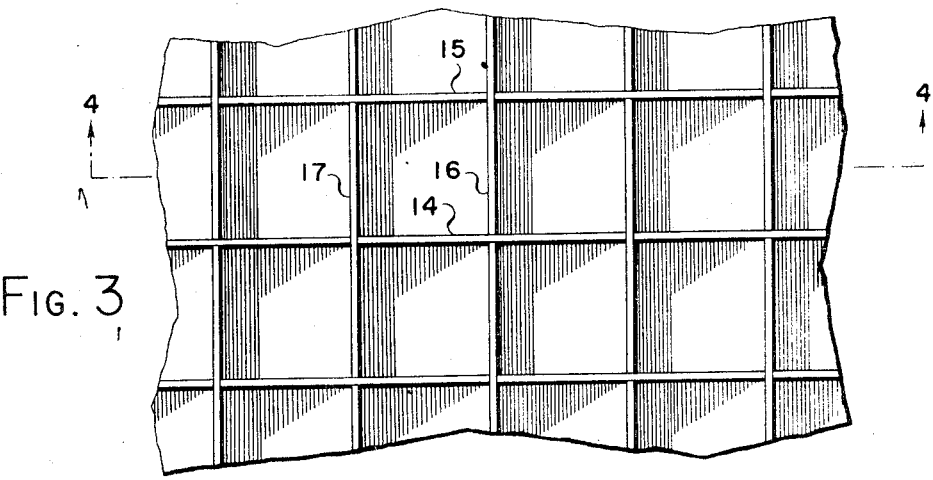
FIG. 3 is a fragmentary top plan view of a plurality of cells of the types shown in FIGS. 1 and 2.
Figure 4:
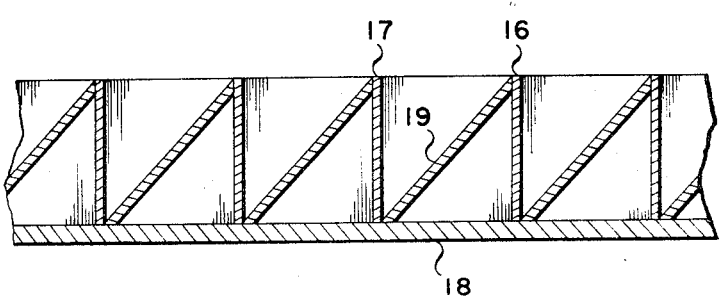
FIG. 4 is a cross sectional elevation view of the apparatus of FIG. 3, taken along line 4—4.

There is shown in FIGS. 3–4 an array of square compartments closed at one end by impermeable backing member 18. A typical compartment or cell is bounded on four sides by walls 14–17. In each cell there is permeable, flow resistive, obliquely disposed element 19. No face sheet at all is present.

Figure 5:
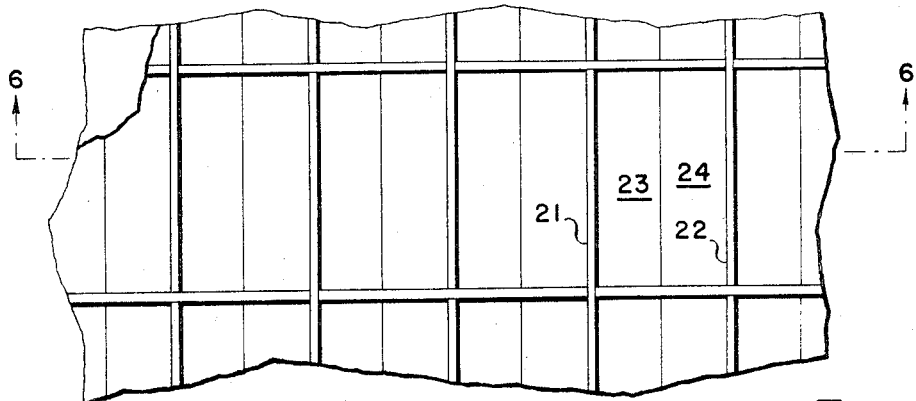
FIG. 5 is a top plan view of an alternate embodiment of the invention.
Figure 6:
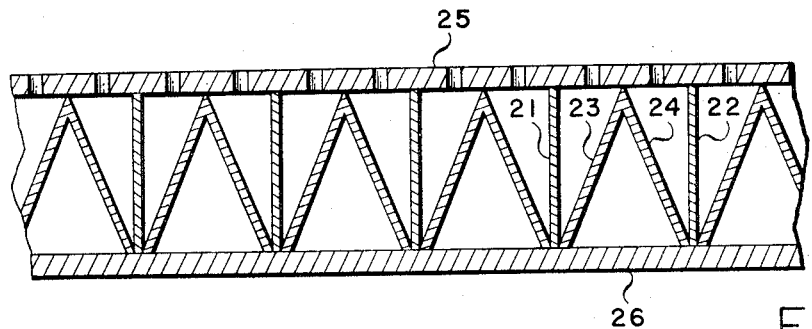
FIG. 6 is a cross sectional elevation view of the apparatus of FIG. 5, taken along line 6—6.

The permeable or perforated face sheet typical of prior art constructions is not needed or even particularly desirable for any acoustical function in the present invention. A facing may be used if desired for structural, aerodynamic, or other reason. If used, it should be quite low in flow resistance and freely penetrated by the sound in order not to interfere with the function of the oblique partition elements. If the facing has the order of flow resistance normally used for laminar absorbers, the total impedance of the series combination is the vector sum of that due to the inclined element and that due to the facing. This provides an additional degree of flexibility to the designer. FIGS. 5 and 6 show the invention with a perforated facing sheet and an alternate form of oblique element installed in each cell. Here, the inclined permeable element comprises a pair of sheets 23–24 which form a triangular member within each cell.

Figure 7:
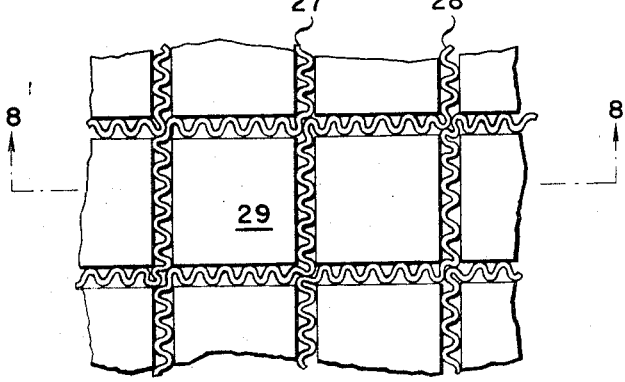
FIG. 7 is a top plan view of a third embodiment of the invention.
Figure 8:
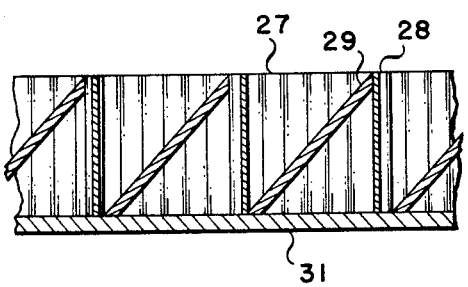
FIG. 8 is a cross section elevation view of the apparatus of FIG. 7, taken along line 8—8.

FIGS. 7–8 illustrate the use of corrugated wall members 27 and 28 to divide the panel into cellular compartments (e.g., 29). The cells are closed at one end by impermeable backing member 31. A practical variation of this construction is to provide at least a portion of the required permeability in the device by means of the leakage between the oblique element and the corrugations In the event this flow resistance is too high, it may be reduced by the use of an oblique element having a substantially higher flow resistance than would otherwise be required.

Figure 9:
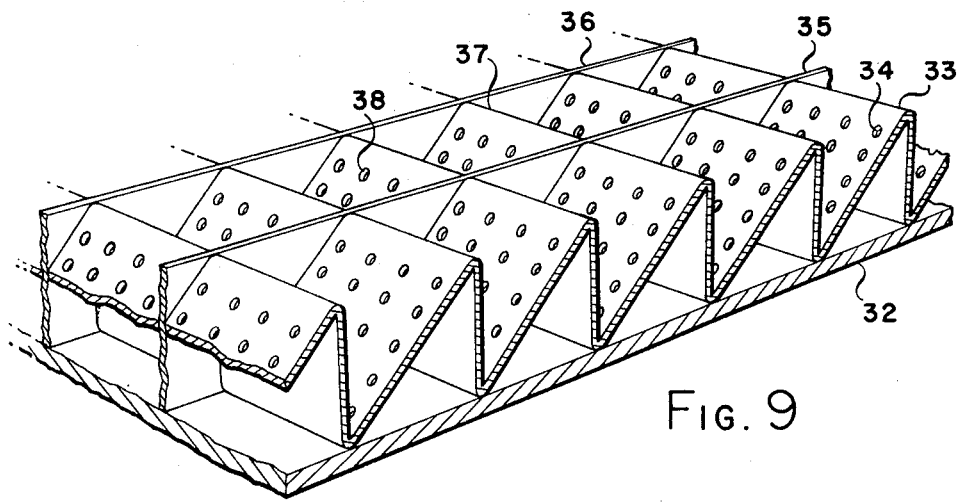
FIG. 9 is a perspective view, partially broken away, illustrating a fourth embodiment of the invention.

FIG. 9 shows the use of sawtooth strips or ribbons 33 and 37 separated by impermeable strips 35 and 36 stacked together on a back plate 32 to form a structure similar to that shown in FIG. 3. Note that only the slanting portion of the sawtooth strip (33, 37) is made permeable. The permeability of sloping face of the strips 33 and 37 is schematically shown by apertures 34 and 38 since in an ordinary construction the openings in the oblique element would not be readily apparent to the naked eye. The preferred construction employs felted fibrous sheet. The vertical portion of ribbons 33 and 37 is impermeable. The plain strips 35 and 36 interposed between the sawtooth-folded ribbons 33 and 37 are preferably impermeable although a large value of flow resistance would be allowable.

Figure 10:
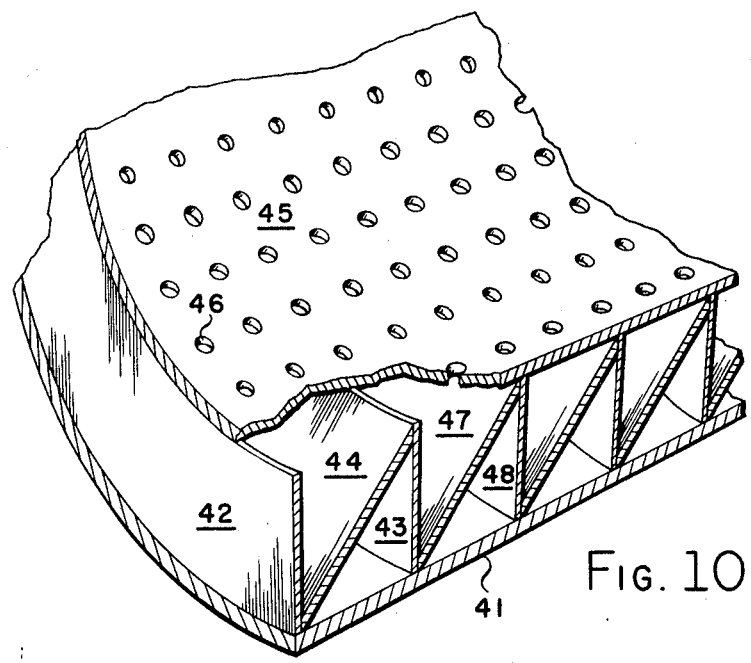
FIG. 10 is a fragmentary perspective view, partially broken away, illustrating a curved member constructed in accordance with the invention.

FIG. 10 shows an embodiment of a sound absorber, constructed in accordance with the invention, which is particularly useful as a duct liner or for installation in the housing or pod enclosing an aircraft jet engine. This construction comprises a backing member 41 in the form of a solid sheet of metal or similar material. Extending upwardly from backing member 41 there are a plurality of ring-shaped and spaced apart parallel walls 42, 43, and 48 which divide the structure into adjacent cellular compartments. Each compartment contains a diagonal permeable oblique partition. For example, partition 44 is carried within the compartment defined by walls 42 and 43 and backing member 41. Similarly, partition 47 is located in the adjacent cellular compartment. The entire structure is provided with a perforate facing member 45 which is preferably fabricated from sheet metal and provided with a plurality of spaced apart apertures of which 46 is typical.

It will be appreciated, by those versed in the art, that the structure described above in connection with FIG. 10 may be extended or repeated in any suitable and desired manner. For example, the structure may be formed into a closed cylindrical shape which could be of such size as to permit it to encircle a jet engine or the like.

Figure 11:
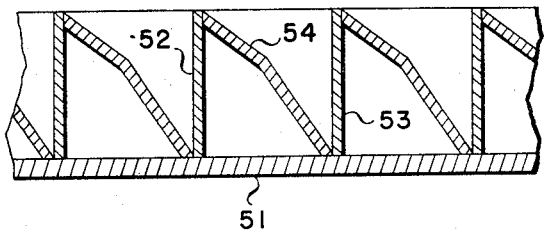
FIG. 11 is a cross sectional elevation view of a fifth embodiment of the invention.
Figure 12:
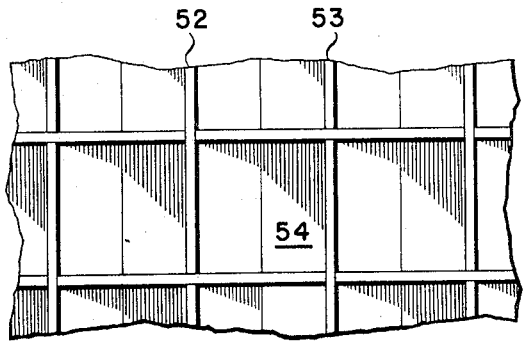
FIG. 12 is a top plan view of the apparatus of FIG. 11.

There is shown in FIG. 11 yet another modification of the apparatus of the invention in which the oblique permeable partition comprises two flat portions having an intermediate juncture. It is clear that if the oblique element has more than one slope, then each portion would have its distinct value of flow resistance in accordance with the rule $R = 2 \rho c \sec \theta$. A typical cell is bounded by solid backing member 51 and orthogonal perpendicular walls 52, 53, 55 and 56. Partition 54 is disposed within the cell and extends from the upper edge of wall 52 to the juncture between backing member 51 and wall 53. The adjacent cells have a similar configuration, and the overall structure may be repeated in orthogonal directions to any desired extent. It is evident that the same basic structures can be made in multiple layers, placed back to back, formed in compound curves, etc. Also, the oblique element could be formed into numerous flat sections each having a different angle $\theta$, and preferably a different flow resistance, and in the limit could even be continuously curved with a continuously varying flow resistance.

Figure 14:
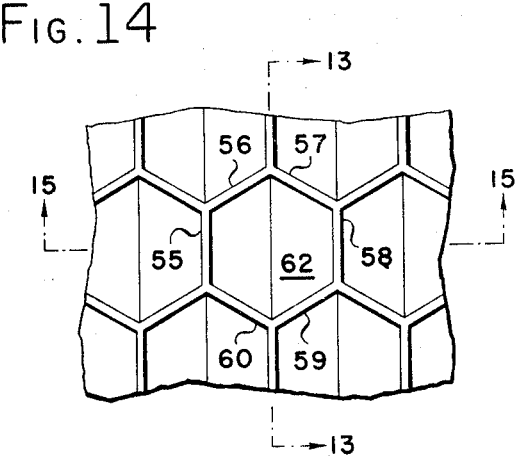
FIG. 14 is a top plan view of the apparatus of FIG. 13.
Figure 13:
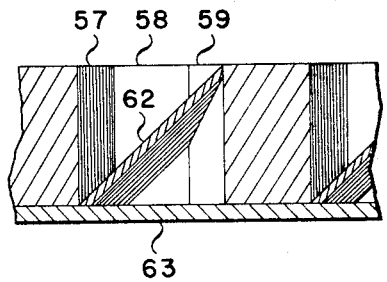
FIG. 13 is a cross sectional elevation view of an embodiment of the invention incorporating hexagonal cells.
Figure 15:
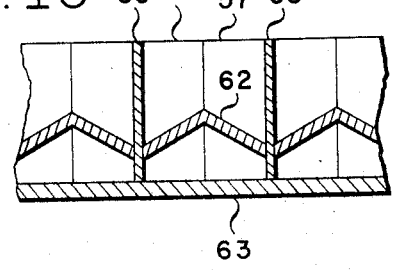
FIG. 15 is a cross sectional view taken along line 15—15 of FIG. 14.

There is shown in FIGS. 13–15, a species of the invention in which hexagonal cells are employed rather than the aforementioned square or rectangular cells. A typical cell comprises walls 55–60 which define the boundaries of a hexagon. One end of the hexagonal cell is closed by impermeable backing member 63. The open end of the hexagonal cell is directed toward the source of sound which is to be absorbed. Each cell is provided with a roof-shaped partition 62 fabricated from a porous or permeable material having the appropriate flow resistance, as mentioned previously.

Figure 16:
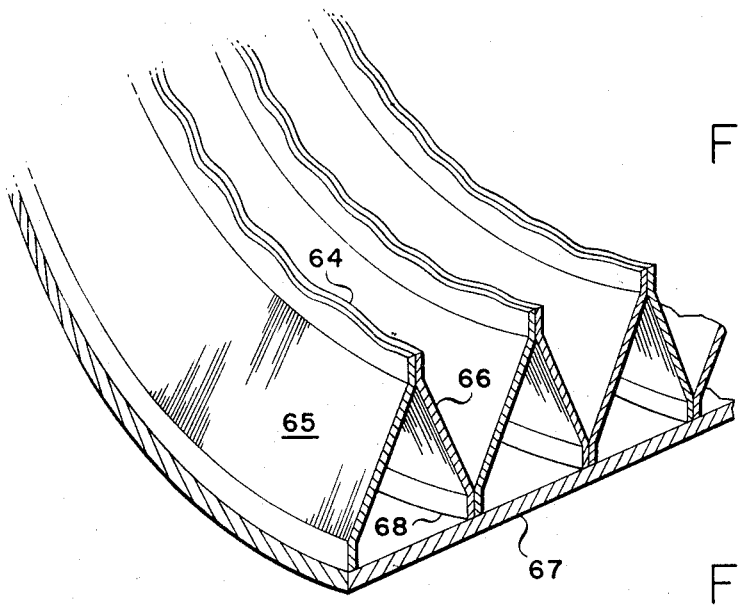
FIG. 16 is a fragmentary perspective view of a curved structural member constructed in accordance with the invention.

The embodiment of the invention shown in FIG. 16 is intended for the same general types of applications as that described previously in connection with embodiment shown in FIG. 10. However, in this latter instance certain economies of construction may be obtained by reason of the novel geometry incorporated therein. As can be seen this construction comprises a solid backing member 67 which may be in the form of a cylindrical duct or conduit. The interior surface of the conduit (viz, the upper face of backing member 67) supports compartment-defining partitions 65 and 66 which have their lower edges spaced apart and their upper edges secured together by means of weldment 64 or other suitable fastening means. The lower edge of partition 65 is secured to the adjacent partition 69 by means of weldment 68 (or other suitable fastening means) which also serves to secure the structure to the backing member 67. It should be understood that partition 65, 66 and 69 are fabricated from felted metal or other material having an appropriate flow resistance. Note the absence of compartmentation in the tangential direction. In such a duct it is desired to attenuate sound propagation in the axial direction. Thus, noise flanking paths in the tangential direction are relatively harmless. The tangential passages permit free drainage of any liquids that might otherwise accumulate.

Figure 17:
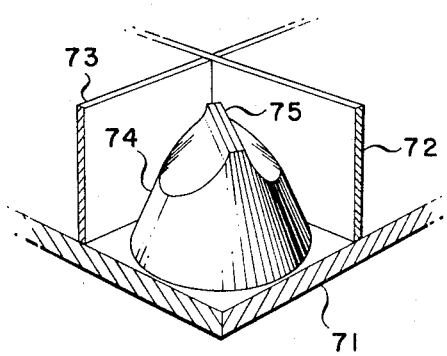
FIG. 17 is a perspective view, partially in section, illustrating an embodiment of the invention incorporating truncated conical resistive members.
Figure 18:
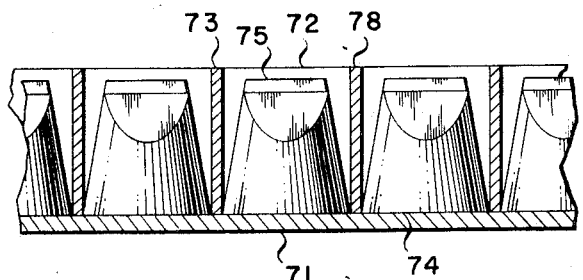
FIG. 18 is a cross sectional elevation view of the apparatus of FIG. 17.
Figure 19:
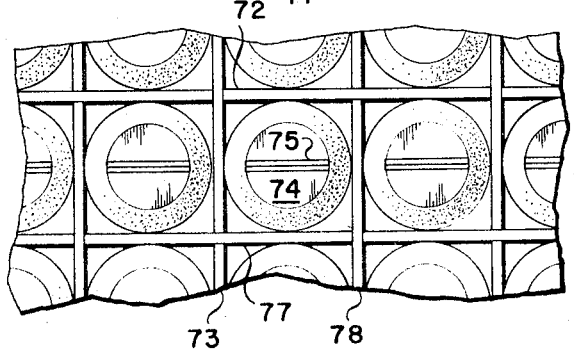
FIG. 19 is a top plan view of the apparatus of FIG. 18.

The embodiment shown in FIGS. 17–19 differ from those previously described primarily with respect to the nature of the oblique permeable element carried within each cell. In this construction the cell is bounded by impermeable backing member 71 and cell defining wall members 72, 73, 77 and 78. Carried within each cell is a truncated cone 74 having its base secured to backing member 71 by any suitable means. The apex of the cone 74 is truncated and crimped along crimp seam 75 so as to reduce the altitude dimension of the cone to be commensurate with the depth of the cell. This geometry results in the functional area of the permeable cone being maximized. It should be understood that the base of the cone could also be directed towards the noise source.

Figure 20:
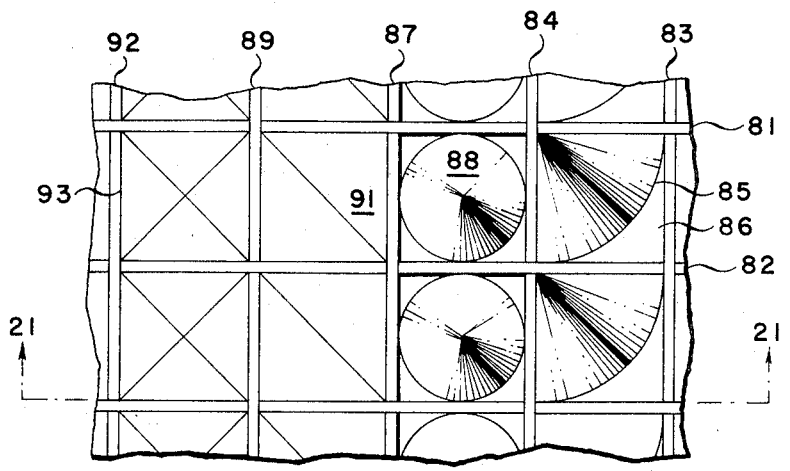
FIG. 20 is a top plan view of an embodiment of the invention incorporating various conical and pyramidal resistive elements.
Figure 21:
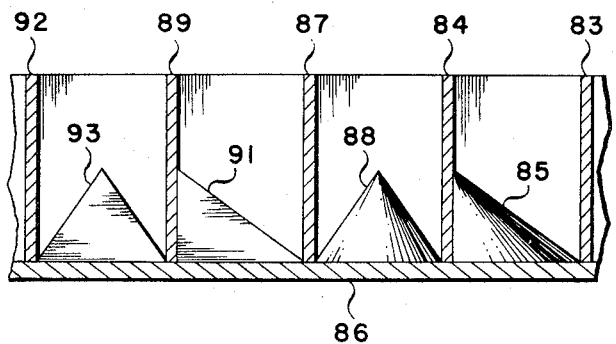
FIG. 21 is a cross sectional elevation view of the apparatus of FIG. 20.

FIGS. 20 and 21 illustrate diverse geometries which may be employed for the permeable oblique members. The various constructions are shown in adjacent compartments, it being understood that this arrangement is illustrative and by way of example only, since in a practical construction economies would dictate that all cells be made to have like geometry.

The rectangular cells are bounded by walls 81–84, 87 and 92. The bottom or closed end of each cell is enclosed by common backing member 86 which is secured to the wall members by any suitable means. Partition 85 comprises a 90° section of a cone having its major altitude dimension located along the juncture of wall 81 and 84.

Cone 88 comprises a circular cone of permeable material centered within the cell bounded by walls 84 and 87. The base dimension of the cone 88 is substantially equal to the interior wall-to-wall dimensions of the cell. Partition 91 comprises a 180° sector of a four-sided pyramid having its altitude dimension located at the juncture between walls 81 and 89.

The partition 93 located within the cell bounded by walls 81, 82, 89 and 92 comprises a four-sided pyramid centered within the cell.

From the foregoing it will be seen that the physical implementation of the invention may be accomplished in many ways, it being only essential that those features common to the several described embodiments be incorporated into any given structure. By way of summary, the functioning of the apparatus of the invention may be described as follows: In operation, the sound wave to be absorbed enters the tubular element or compartment comprising the wave guide. Since the distance between the sides of the tube is assumed less than one-half wavelength the only way the sound can propagate towards the end wall, or back plate, is in the form of a plane wave. Cross modes cannot propagate in a tube whose dimension is less than one-half wavelength. As the plane wave proceeds down the tube, it progressively intersects the oblique or diagonally disposed flow resistance element. The flow through the successive portions of the oblique element reconstructs the plane wave (somewhat attenuated) on the far side of the oblique element. The two segments of the wave front proceed together towards the back plate, reflect and proceed back towards the entrance or sound receiving end of the tube. Their roles are now reversed.

Unlike prior art devices of the type employing multiple or coupled resonators, the present invention is insensitive to the relative volumes of the compartments on either side of the permeable partition. This is because the present invention does not function as a resonator device, but is rather a novel form of a distributed flow resistance.

The overall behavior proves to be less subject to changes in the sound pressure level of the incident sound than would have been heretofore expected when the material in the oblique element is somewhat nonlinear in its flow resistance. This can be interpreted by considering first the case of a simple laminar absorber whose flow resistance is too high. In this instance, a normally incident wave strikes the entire surface at once and is partially reflected due to the impedance mismatch caused by the excessive flow resistance. Now consider a diagonal element whose flow resistance is too high. The progressing sound wave is not immediately reflected, but rather the portion which does not go through the flow resistive oblique element proceeds towards the back plate. The converging cross section of this path causes an increase in the sound pressure in the wave front. This increased sound pressure causes an increase in the local volume flow through the element. Thus, at least in part the non-optimum flow resistance is compensated by the novel obliquely disposed element of the present invention. It follows that excessive flow resistance is less detrimental than inadequate flow resistance because of this inherent self equalizing characteristic of the present invention.

It will be apparent to those versed in the art that various modifications may be made to the representative embodiments of the invention shown and described above.

What is claimed is:

1. A sound absorbing structure comprising:
   means defining an acoustical wave guide having an open sound receiving end for constraining the propagation of sound as essentially planar waves along a path defined by the boundaries of the wave guide; and,
   a permeable member located within said wave guide and having at least a portion thereof inclined with respect to said path.

2. A sound absorbing structure as defined in claim 1 including impermeable means closing one end of said wave guide.

3. A sound absorbing structure as defined in claim 2 including an air permeable, relatively sound-transparent sheet closing the other end of said wave guide.

4. A sound absorbing structure as defined in claim 1 wherein said waveguide has a transverse dimension which is less than one-half wavelength of the sound to be absorbed.

5. A sound absorbing structure as defined in claim 2 wherein said permeable member has a predetermined leakage path around at least a part of its perimeter.

6. A sound absorbing structure as defined in claim 2 wherein said permeable member extends substantially the length of said wave guide.

7. A sound absorbing structure as defined in claim 1 wherein said wave guide defining means is tubular.

8. A sound absorbing structure as defined in claim 1 wherein said permeable member comprises a sheet of felted metal fibers.

9. A sound absorber which is linear over a wide range of sound pressure levels, comprising:
   a parallel array of acoustical wave guides each having an open sound-receiving end, and each having a transverse dimension which is less than one-half wavelength of the sound to be absorbed; and,
   a plurality of permeable flow resistive partitions, each of which is obliquely disposed within a corresponding wave guide of said array.

10. A sound absorber comprising:
   a plurality of corrugated wall-defining means coplanarly arranged to provide a plurality of side-by-side compartments;
   an impermeable sheet disposed perpendicularly to said wall-defining means for closing like ends of said compartments; and,
   a plurality of partitions each of which is obliquely disposed within a corresponding one of said compartments.

11. A sound absorber as defined in claim 10 wherein said wall-defining means are permeable and said partitions are impermeable.

12. A sound absorber as defined in claim 10 wherein said wall-defining means are impermeable and said partitions are permeable.

13. A sound absorber as defined in claim 10 including:
   a relatively sound-transparent sheet covering the ends of said compartments opposite said impermeable sheet.

14. A sound absorber comprising:
   an impermeable backing sheet;
   a plurality of impermeable, elongate, parallel, spaced-apart partitions extending perpendicularly from said backing sheet; and,
   a plurality of ribbon members having a width equal to the spacing between said partitions and each of which is disposed between a corresponding pair of said partitions, said ribbon members having a repetitive saw-tooth folded shape wherein the base of said folds abuts said backing sheet and the apex of said folds is substantially coplanar with the edges of said partitions which extend away from said backing sheet, and at least a portion of said ribbon members being permeable.

15. A sound absorber as defined in claim 14 wherein each of said ribbon members has an impermeable portion extending perpendicularly from said backing sheet, and a permeable portion slanting from said perpendicular portion.

16. A sound absorber as defined in claim 14 including:
   a relatively sound-transparent sheet abutting said edges of said partitions extending away from said backing sheet.

17. A sound absorber as defined in claim 16 wherein said relatively sound-transparent sheet and said backing sheet comprise at least arc sections of coaxial cylinders.

18. A sound absorber comprising:
   an impermeable backing sheet;
   a first series of permeable spaced-apart elongate members having their lower edges secured to said backing sheet and extending obliquely therefrom in a first direction; and,
   a second series of permeable elongate members interposed between corresponding pairs of said first series of members and having their lower edges abutting the corresponding adjacent lower edges of said first series of members and extending obliquely from said backing sheet in a second direction so as to permit the upper edges of adjacent pairs of said first and secured series of members to intersect.

19. A sound absorber as defined in claim 18 wherein said backing sheet comprises at least a section of a cylinder and said first and second series of members are curved in the direction of their major dimension.

20. A sound absorber comprising:
   a parallel array of acoustical wave guides each having an open sound-receiving end;
   a plurality of partitions each of which is obliquely disposed within a corresponding wave guide of said array; and,
   means providing a predetermined acoustic leakage around at least a part of the perimeter of said partitions.

21. A sound absorber as defined in claim 20 including:
   a common impermeable backing member closing like ends of said array of wave guides opposite said open sound-receiving ends.

22. A sound absorber as defined in claim 21 including:
   a common, relatively sound-transparent, member extending over the sound-receiving ends of said array of wave guides.

23. A sound absorber as defined in claim 20 wherein said partitions comprise two triangularly-disposed sections.

24. A sound absorber comprising:
   a tubular acoustical wave guide, the transverse dimensions of which is a fraction of the wavelength of the sound to be absorbed, having a closed end and an open sound-receiving end;
   a first permeable partition segment extending obliquely at a first angle from said closed end; and
   a second permeable partition segment contiguous with said first segment and extending therefrom at a second angle with respect to said closed end.

25. A sound absorber as defined in claim 24 wherein said wave guide has a hexagonal cross section.

26. A sound absorber as defined in claim 24 wherein the juncture between said segments extends across the transverse axis of said wave guide.

27. A sound absorber as defined in claim 24 wherein said first and second segments comprise felted metal fibers.

28. A sound absorber as defined in claim 24 wherein the perimeters of said first and second segments abut and are secured to the interior walls of said wave guide.

29. A sound absorbing structure, comprising:
   a substantially impermeable backing member;
   wall means secured to said backing member and extending upwardly therefrom for forming a walled compartment of uniform height which is open at one end and which is closed at the other end by said backing member; and,
   an air-permeable partition disposed within said compartment so as to divide the volume thereof into two subcompartments, said partition being everywhere angularly disposed with respect to the plane of the open end of said compartment.

30. A sound absorbing structure, comprising:

a substantially impermeable support sheet;

a relatively sound-transparent facing sheet spaced apart from said support sheet by a predetermined distance;

wall means interposed between said facing sheet and said support sheet, and secured thereto, for defining a plurality of cellular compartments; and, permeable partition means obliquely disposed with respect to said facing sheet and support sheet for dividing each of said compartments into two sub-compartments.

31. A sound absorbing structure as defined in claim 30 wherein said partition means comprises:

a plurality of permeable conical members one each of which is disposed within each of said compartments, the base areas of said cones being substantially co-extensive with the base area of said compartments.

32. A sound absorbing structure comprising:

means defining an acoustical wave guide for constraining the propagation of sound waves along a path defined by the boundaries of the wave guide; and a flow resistive sheet located within said wave guide and having at least a portion thereof inclined with respect to said path, said sheet having a finite flow resistance greater than 80 cgs Rayls as measured at a pressure differential corresponding to the sound pressure in said wave guide.

33. A sound absorbing structure comprising:

means defining an acoustical wave guide for constraining the propagation of sound waves along a path defined by the boundaries of the wave guide;

means closing one end of said wave guide; and, a permeable member located within said wave guide and having at least a portion thereof inclined with respect to said path, said permeable member having a flow resistance approximately equal to $2 \rho C \sec \theta$ where $\rho$ equals the density of the fluid medium through which sound is propagated in said wave guide, $c$ equals the speed of sound, and $\theta$ equals the angle between said inclined member and said end closing means.

34. A sound absorbing structure comprising:

means defining an acoustical wave guide for constraining the propagation of sound waves along a path defined by the boundaries of the wave guide; and, a permeable member located within said wave guide and having at least a portion thereof inclined with respect to said path, the permeability of said permeable member being such as to have an effective flow resistance equal to $A \rho c \sec \theta$ where $\rho$ is the density of the fluid medium through which sound is propagated in said wave guide, $c$ is the velocity of sound in said medium, $\theta$ is the angle of inclination between said permeable member and a plane perpendicular to the wave guide apex, and $A \cong 2$.

35. A sound absorbing structure comprising:

means defining an acoustical wave guide for constraining the propagation of sound waves along a path defined by the boundaries of the wave guide; and, a permeable member located within said wave guide and having at least a portion thereof inclined with respect to said path, the permeability of said permeable member being such as to have a flow resistance equal to $A \rho c \sec \theta$ where $\rho$ is the density of the medium through which sound is propagated in said wave guide, $c$ is the velocity of sound in said medium, $\theta$ is the angle of inclination between said permeable member and a plane perpendicular to the wave guide axis, and $A$ has a value in the range from 1 to 10.

36. A sound absorbing structure comprising:

means defining an acoustical wave guide for constraining the propagation of sound waves along a path defined by the boundaries of the wave guide;

means closing one end of said wave guide; and a conically-shaped permeable member located within said wave guide, the apex of which is adjacent said one end closing means.

37. A sound absorbing structure comprising:

means defining an acoustical wave guide for constraining the propagation of sound waves along a path defined by the boundaries of the wave guide;

means closing one end of said wave guide; and, a pyramidal-shaped permeable member located with said wave guide, the apex of which is adjacent said one end closing means.

38. A sound absorbing structure comprising:

means defining an acoustical wave guide having an hexagonal cross section for constraining the propagation of sound wave along a path defined by the boundaries of the wave guide; and, a permeable member located within said wave guide and having at least a portion thereof inclined with respect to said path.

39. A sound absorber as defined in claim 38 including: a relatively sound-transparent sheet covering the face of said array opposite said impermeable sheet.

40. A sound absorbing structure comprising:

means defining an acoustical wave guide for constraining the propagation of sound waves along a path defined by the boundaries of the wave guide;

means closing one end of said wave guide; and, a conically-shaped permeable member located within said wave guide, the base of which abuts said one end closing means.

41. A sound absorbing structure comprising:

means defining an acoustical wave guide for constraining the propagation of sound waves along a path defined by the boundaries of the wave guide;

means closing one end of said wave guide; and, a pyramidal-shaped permeable member located within said wave guide, the base of which abuts said one end closing means.

42. A sound absorber which is linear over a wide range of sound pressure levels, comprising:

a parallel array of acoustical wave guides each having a transverse dimension which is less than one-half wavelength of the sound to be absorbed;

an impermeable sheet closing like ends of the wave guides comprising said array; and, a plurality of permeable flow resistive partitions, each of which is obliquely disposed within a corresponding wave guide of said array.

43. A sound absorber comprising:

a parallel array of acoustical wave guides;

a plurality of partitions each comprising a contiguous section of an integral, folded, ribbon obliquely disposed within a corresponding wave guide of said array; and, means providing a predetermined acoustic leakage around at least a part of the perimeter of said partitions.

* * * * *